United States Patent Office 3,278,624
Patented Oct. 11, 1966

3,278,624
IMPROVING THE ODOR OF SOLVENTS
Arthur M. Thomas, Jr., Rahway, N.J., assignor to Esso Research and Engineering Company, a corporation of Delaware
No Drawing. Filed July 5, 1963, Ser. No. 293,183
8 Claims. (Cl. 260—676)

This invention relates to improved, high quality solvents which are exceptionally suitable for use in the cosmetic industry. In particular, the invention relates to organic solvents, usually derived from petroleum in some manner, having an extremely low odor and methods of processing to produce such solvents. Even more particularly, this invention relates to a process for producing high level, virtually odorless solvents from paraffinic-type solvents and, even more particularly, alkylate-type isoparaffinic solvents.

Petroleum-based solvents have wide applicability in many fields as high quality solvents. They may be used as dry cleaning solvents, as solvents for formulating odorless paints and other industrial uses where solvents with low odors are necessary. These solvents can be processed in ways known to the art such as adsorption, hydrogenation, chemical extraction, and other well-known processes to reduce, but not eliminate altogether, a characteristic petroleum odor.

Even though these solvents have a very low odor which makes them eminently suitable for a variety of solvent applications, there are certain applications, such as for cosmetics, where their odor is still not sufficiently low. It has been discovered, and forms the essence of this invention, that high quality solvents, which are even considered odorless for ordinary uses, can be further treated to reduce their odor to levels which makes these solvents acceptable for cosmetic applications.

High viscosity U.S.P. white oils are examples of products which have acceptable odor levels. However, these odor levels had not previously been obtainable in products having the boiling range described in this invention. Although the white oils are satisfactory from an odor standpoint, they are too viscous for many cosmetic solvent purposes. The most preferred solvents of the invention are eminently satisfactory from both an odor and viscosity standpoint. Solvents boiling within the range of about 200 to 360° F. when treated according to the process of the invention lose their characteristic kerosene odor, but still have some hydrocarbon odor because of the relatively low volatility. However, these treated solvents are still of value for uses where the hydrocarbon odor is not objectionable.

In general, the method of the invention is applicable to all paraffinic type solvents regardless of source but, preferably, relates to isoparaffinic-type solvents which boil within the range of 200 to 900, preferably 300 to 800 and, most preferably, alkylate type solvents which boil within the range of 360 to 420° F. One source of the preferred isoparaffinic solvents is from conventional alkylation processes which involve the reaction of $C_4$ to $C_5$ isoparaffins with $C_3$ to $C_5$ olefins to produce branched chain isoparaffinic fractions boiling within the range disclosed above. These isoparaffinic fractions will normally be from within the range of $C_9$ to $C_{17}$, preferably $C_{12}$ to $C_{15}$ aliphatic hydrocarbons which are usually highly branched.

The preferred isoparaffinic solvents can also be obtained from a controlled polymerization process which involves the reaction of propylene to produce propylene tetramer. This material is subsequently hydrogenated to produce isoparaffinic fractions boiling in the range of $C_9$ to $C_{15}$ which are also usually highly branched.

In general, the process of the invention involves the contacting of a paraffinic solvent having an ordinarily low odor with a combination of activated alumina and 13X molecular sieve adsorbents at any convenient pressure, usually atmospheric or 1 to 10, e.g. 1 to 5, p.s.i.g. above atmospheric. Such treatment removes alkyl benzenes ($C_7$–$C_{10}$) and light $C_3$–$C_8$ olefins which have been shown to contribute to odor and cannot be removed by other means, as well as other unknown materials which cause odor.

In general, the adsorbent combination in each adsorbent zone will comprise 25 to 75, preferably 40 to 60, wt. percent and very preferably, 45 to 55, wt. percent of activated alumina and 75 to 25, preferably 60 to 40, and very preferably, 55 to 45, wt. percent of 13X molecular sieve. The most preferred combination of alumina and molecular sieve is about 50% by weight of alumina and about 50% by weight of 13X molecular sieve.

The solvent is percolated through the adsorbent combination at a rate between 0.1 to 5, preferably 0.5 to 3 and, most preferably, 0.5 to 1 v./v./hr. Although it is preferred that the total volume of solvent per total volume of adsorbent is not more than about 4 volumes of solvent per total volume of adsorbent, very good results can be obtained with up to 10 volumes of solvent per total volume of adsorbent and satisfactory results can be obtained with up to 15 volumes of solvent per total volume of adsorbent.

The adsorbents of the combination may be placed in an adsorbent zone either in two separate layers, several separated layers, or intimately mixed throughout the zone. The 13X molecular sieves and activated alumina are widely known standard commercial adsorbents and need not be further described. 13X sieves can be obtained from the Linde Co. which is a subsidiary of Union Carbide.

An additional facet of the invention is the discovery that various inhibitors can be used to keep the treated solvents odor-free over a long period of time. This can be especially important for storage and transient purposes. Since the solvents will usually find use in cosmetics, food grade inhibitors approved by the FDA must be used. Such inhibitors include tocopherol, 2-6,di-t-butyl-4-methyl phenol (BHT), and a mixture of 3-t-butyl-4 hydroxyanisole and 2-t-butyl-4-hydroxyanisole (BHA). Also, since the treated solvents are of such a low odor, care must be taken in selecting the inhibitor so that the inhibitor itself does not contribute to the odor of the solvent. Other suitable nonodor-causing additives can also be used. In general, from 2 to 4, preferably about 3, pounds of inhibitor per thousand gallons of solvent are used.

The invention is further illustrated by the following examples.

EXAMPLE 1

Various isoparaffinic solvent fractions produced from alkylate fractions and having boiling ranges within 370 to 410° F., were percolated over a variety of individual adsorbents or adsorbent combinations in a column at a temperature of 75° F. and at atmospheric pressure. The flow rate was 0.5 volume of solvent per total volume of adsorbent per hour for a total treatment of 2.5 volumes of solvent per total volume of adsorbent per run.

Since the solvents, prior to treatment by the process of the invention, were virtually odorless, the treated solvent's odor could only be determined by a trained panel or experts evaluating odor under carefully controlled environmental conditions. The adsorbents used and the rating of preference by the panel are summarized in Table I. In this table the higher numbers represent more odor and the lower numbers represent less odor.

Table I

| Column packing: | Bulk odor order of preference |
|---|---|
| Untreated | 13 |
| 4A molecular sieve | 11 |
| ½ charcoal +½ 4A molecular sieve | 11 |
| ½ activated alumina +½ silica gel | 11 |
| ½ charcoal +½ activated alumina | 9 |
| Activated alumina | 9 |
| Activated charcoal | 8 |
| 13X molecular sieve | 7 |
| ⅓ activated alumina +⅓ 13X molecular sieve +⅓ activated charcoal | 5 |
| ½ activated alumina +½ 13X molecular sieve | 4 |

It can be seen from the data in the above table that all the adsorbents tried in the example lower the odor of the alkylate fraction to some extent. However, a suitable combination of adsorbents lowers the odor more than either of the individual adsorbents. The odor level of 4–5 represents an odor level acceptable to the cosmetic industry. Moreover, it also represents a product which has no characteristic kerosene petroleum odor.

EXAMPLE 2

Different inhibitors were added to three 10-gallon samples of the treated solvent (odor level 4) at the rate of 9 p.p.m. of inhibitor/sample. This is at a rate of approximately three pounds of inhibitor per thousand gallons of solvent. These samples were rated by the panel of experts. The results are summarized in Table II.

Table II

| Composition | Added Inhibitors | Odor Rating |
|---|---|---|
| Control | None | 4 |
| A | BHA | 6 |
| B | BHT | 4 |
| C | Tocopherol | 8 |

As can be seen when BHT is used it does not increase the odor of the solvent by its presence. The control and sample above containing BHT were stored at ambient conditions for six months. Odor was rated. The results are summarized in Table III.

Table III

| Composition | Added Inhibitors | Initial Rating | Six-Month Rating |
|---|---|---|---|
| Control | None | 4 | 15 |
| B | BHT | 4 | 4 |

From Table III it can be seen that odor degradation can be effectively prevented by the use of the preferred BHT inhibitor.

Although the invention has been described with a certain degree of particularity, it will be understood that variations and modifications can be effected therein without altering the scope of the invention as hereinafter claimed. Thus the preferred 13X molecular sieve has been referred to in this specification but it is to be understood that the invention contemplates the use of zeolite X molecular sieves having pore sizes of from about 7 to 11 Angstrom units. The 10X zeolite is another preferred molecular sieve which is also commercially available from the Linde Co. Zeolite X sieves are described in full in U.S. Patent 2,882,244.

What is claimed is:

1. A method of reducing the odor of a paraffinic-type solvent which comprises contacting said solvent with an adsorbent combination comprising 25–75 wt. percent of alumina and 75–25 wt. percent of 13X molecular sieves.

2. A process according to claim 1 wherein said solvent is percolated through said adsorbent combination at a rate of 0.1 to 5 v./v./hr.

3. A method according to claim 1 wherein said solvent is from within the range of $C_9$–$C_{15}$ branched chain aliphatic hydrocarbon boiling within the range of 300–800° F.

4. A process according to claim 1 wherein said solvent has a boiling range of 360–420° F.

5. A process for removing a characteristic petroleum kerosene odor from a predominantly isoparaffinic mixture which comprises percolating said isoparaffinic mixture through an adsorbent combination comprising about 50% alumina and about 50% 13X molecular sieve at a flow rate of about 0.5 v./v. for a total treatment of about 2.5 volumes of solvent per volume of adsorbent combination.

6. A process according to claim 5 wherein said isoparaffinic portion is within the range of about 360–420° F.

7. A process according to claim 6 wherein said isoparaffin is obtained from an alkylation reaction between $C_4$ to $C_5$ isoparaffins with $C_3$ to $C_5$ olefins.

8. A method of reducing the odor of a paraffinic-type solvent which comprises contacting said solvent with an adsorbent combination comprising 25–75 wt. percent of alumina and 75–25 wt. percent of zeolite X having a pore size of from about 7 to 11 Angstroms.

References Cited by the Examiner

UNITED STATES PATENTS

| | | | |
|---|---|---|---|
| 2,851,506 | 9/1958 | Ayers et al. | 260—666.5 |
| 2,971,993 | 2/1961 | Kimberlin et al. | 208—310 |
| 3,070,542 | 12/1962 | Asher et al. | 208—310 |
| 3,161,488 | 12/1964 | Eastwood et al. | 208—310 |